US009324006B2

(12) United States Patent
Vanhoucke et al.

(10) Patent No.: US 9,324,006 B2
(45) Date of Patent: Apr. 26, 2016

(54) SYSTEM AND METHOD FOR DISPLAYING CONTEXTUAL SUPPLEMENTAL CONTENT BASED ON IMAGE CONTENT

(71) Applicant: Google Inc., Mountain View, CA (US)

(72) Inventors: Vincent O. Vanhoucke, San Francisco, CA (US); Salih Burak Gokturk, Mountain View, CA (US); Munjal Shah, Los Altos Hills, CA (US); Julie Baumgartner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/697,190

(22) Filed: Apr. 27, 2015

(65) Prior Publication Data

US 2015/0227813 A1 Aug. 13, 2015

Related U.S. Application Data

(63) Continuation of application No. 13/858,589, filed on Apr. 8, 2013, now Pat. No. 9,047,654, which is a continuation of application No. 12/182,122, filed on Jul. 29, 2008, now Pat. No. 8,416,981.

(60) Provisional application No. 60/952,587, filed on Jul. 29, 2007.

(51) Int. Cl.
G06K 9/00 (2006.01)
G06K 9/62 (2006.01)
G06Q 30/02 (2012.01)
G06T 7/00 (2006.01)

(52) U.S. Cl.
CPC ............. G06K 9/62 (2013.01); G06K 9/6267 (2013.01); G06Q 30/02 (2013.01); G06Q 30/0251 (2013.01); G06T 7/00 (2013.01)

(58) Field of Classification Search
None
See application file for complete search history.

(56) References Cited

U.S. PATENT DOCUMENTS 5,296,945 A 3/1994 Nishikawa
5,450,504 A 9/1995 Calia
5,734,749 A 3/1998 Yamada
5,781,650 A 7/1998 Lobo (Continued)

FOREIGN PATENT DOCUMENTS

JP 03188586 B2 7/2001
JP 2002328925 A 11/2002

(Continued)

OTHER PUBLICATIONS

Notice of Allowance dated Aug. 11, 2010 for U.S. Appl. No. 11/246,589, 10 pages.

(Continued)

Primary Examiner — Atiba O Fitzpatrick
(74) Attorney, Agent, or Firm — Fish & Richardson P.C.

(57) ABSTRACT

An image-based content item is analyzed to determine one or more interests of a viewer of the content item. The analysis may include performing image analysis on the content item to determine geographic information that is relevant to an image of the content item. The one or more interests may be determined based on an assumption or probabilistic conclusion about a subject of the content item. Further, the one or more interests may be determined by applying one or more rules that utilize the geographic information. For some embodiments, a supplemental content item may be provided to the viewer based on the one or more interests.

20 Claims, 4 Drawing Sheets

(56) References Cited

U.S. PATENT DOCUMENTS

| | | |
|---|---|---|
| 5,845,639 A | 12/1998 | Hochman |
| 5,901,246 A | 5/1999 | Hoffberg |
| 5,982,912 A | 11/1999 | Fukui |
| 6,006,160 A | 12/1999 | Tamaki |
| 6,035,055 A | 3/2000 | Wang |
| 6,173,068 B1 | 1/2001 | Prokoski |
| 6,353,823 B1 | 3/2002 | Kumar |
| 6,381,346 B1 | 4/2002 | Eraslan |
| 6,397,219 B2 | 5/2002 | Mills |
| 6,418,430 B1 | 7/2002 | DeFazio |
| 6,427,020 B1 | 7/2002 | Rhoads |
| 6,470,336 B1 | 10/2002 | Matsukawa |
| 6,546,185 B1 | 4/2003 | Kim |
| 6,549,913 B1 | 4/2003 | Murakawa |
| 6,556,196 B1 | 4/2003 | Blanz |
| 6,556,713 B2 | 4/2003 | Kobayashi |
| 6,564,225 B1 | 5/2003 | Brogliatti |
| 6,606,417 B1 | 8/2003 | Brechner |
| 6,624,843 B2 | 9/2003 | Lennon |
| 6,785,421 B1 | 8/2004 | Gindele |
| 6,792,135 B1 | 9/2004 | Toyama |
| 6,801,641 B2 | 10/2004 | Eraslan |
| 6,819,783 B2 | 11/2004 | Goldberg |
| 6,919,892 B1 | 7/2005 | Cheiky |
| 6,925,197 B2 | 8/2005 | Dimitrova |
| 6,928,231 B2 | 8/2005 | Tajima |
| 6,937,745 B2 | 8/2005 | Toyama |
| 6,999,614 B1 | 2/2006 | Bakker |
| 7,006,236 B2 | 2/2006 | Tomasi |
| 7,006,881 B1 | 2/2006 | Hoffberg |
| 7,027,054 B1 | 4/2006 | Cheiky |
| 7,027,620 B2 | 4/2006 | Martinez |
| 7,054,468 B2 | 5/2006 | Yang |
| 7,140,550 B2 | 11/2006 | Ramachandran |
| 7,203,356 B2 | 4/2007 | Gokturk |
| 7,242,988 B1 | 7/2007 | Hoffberg |
| 7,310,431 B2 | 12/2007 | Gokturk |
| 7,324,693 B2 | 1/2008 | Chen |
| 7,340,077 B2 | 3/2008 | Gokturk |
| 7,349,020 B2 | 3/2008 | Stavely |
| 7,382,903 B2 | 6/2008 | Ray |
| 7,519,200 B2 | 4/2009 | Gokturk |
| 7,542,610 B2 | 6/2009 | Gokturk |
| 7,583,271 B2 | 9/2009 | Kawakami |
| 7,643,671 B2 | 1/2010 | Dong |
| 7,650,319 B2 | 1/2010 | Hoffberg |
| 7,657,100 B2 | 2/2010 | Gokturk |
| 7,657,126 B2 | 2/2010 | Gokturk |
| 7,660,468 B2 | 2/2010 | Gokturk |
| 7,681,140 B2 | 3/2010 | Ebert |
| 7,689,043 B2 | 3/2010 | Austin |
| 7,698,136 B1 | 4/2010 | Nguyen |
| 7,711,155 B1 | 5/2010 | Sharma |
| 7,742,046 B2 | 6/2010 | Fukushima |
| 7,761,713 B2 | 7/2010 | Baar |
| 7,787,025 B2 | 8/2010 | Sanno |
| 7,853,085 B2 | 12/2010 | Miller |
| 7,903,282 B2 | 3/2011 | Furukawa |
| 7,920,187 B2 | 4/2011 | Sanno |
| 7,945,099 B2 | 5/2011 | Gokturk |
| 7,996,218 B2 | 8/2011 | Kim |
| 8,010,458 B2 | 8/2011 | Galbreath |
| 8,165,916 B2 | 4/2012 | Hoffberg |
| 8,233,702 B2 | 7/2012 | Gokturk |
| 8,320,707 B2 | 11/2012 | Gokturk |
| 8,649,572 B2 | 2/2014 | Gokturk |
| 2001/0033690 A1 | 10/2001 | Berche |
| 2002/0097893 A1 | 7/2002 | Lee |
| 2002/0103813 A1 | 8/2002 | Frigon |
| 2002/0107718 A1 | 8/2002 | Morrill |
| 2002/0114522 A1 | 8/2002 | Seeber |
| 2002/0156686 A1 | 10/2002 | Kraft |
| 2002/0187774 A1 | 12/2002 | Ritter |
| 2003/0028451 A1 | 2/2003 | Ananian |
| 2003/0063778 A1 | 4/2003 | Rowe |
| 2003/0063779 A1 | 4/2003 | Wrigley |
| 2003/0169906 A1 | 9/2003 | Gokturk |
| 2003/0195901 A1 | 10/2003 | Shin |
| 2003/0202683 A1 | 10/2003 | Ma |
| 2004/0003001 A1 | 1/2004 | Shimura |
| 2004/0080434 A1 | 4/2004 | Watanabe |
| 2004/0102971 A1 | 5/2004 | Lipscher |
| 2004/0215657 A1 | 10/2004 | Drucker |
| 2004/0264810 A1 | 12/2004 | Taugher |
| 2005/0002568 A1 | 1/2005 | Chupeau |
| 2005/0033641 A1 | 2/2005 | Jha |
| 2005/0078885 A1 | 4/2005 | Ozaki |
| 2005/0094897 A1 | 5/2005 | Zuniga |
| 2005/0102201 A1 | 5/2005 | Linker |
| 2005/0111737 A1 | 5/2005 | Das |
| 2005/0271304 A1 | 12/2005 | Retterath |
| 2005/0273832 A1 | 12/2005 | Zigmond |
| 2006/0008150 A1 | 1/2006 | Zhao |
| 2006/0053342 A1 | 3/2006 | Bazakos |
| 2006/0097988 A1 | 5/2006 | Hong |
| 2006/0133699 A1 | 6/2006 | Widrow |
| 2006/0136982 A1 | 6/2006 | Martinolich |
| 2006/0143176 A1 | 6/2006 | Mojsilovic |
| 2006/0173560 A1 | 8/2006 | Widrow |
| 2006/0173841 A1 | 8/2006 | Bill |
| 2006/0227992 A1 | 10/2006 | Rathus |
| 2006/0251292 A1 | 11/2006 | Gokturk |
| 2006/0251338 A1 | 11/2006 | Gokturk |
| 2006/0251339 A1 | 11/2006 | Gokturk |
| 2006/0253491 A1 | 11/2006 | Gokturk |
| 2007/0003113 A1 | 1/2007 | Goldberg |
| 2007/0078846 A1 | 4/2007 | Gulli |
| 2007/0081744 A1 | 4/2007 | Gokturk |
| 2007/0098303 A1 | 5/2007 | Gallagher |
| 2007/0220040 A1 | 9/2007 | Do |
| 2007/0244903 A1 | 10/2007 | Ratliff |
| 2007/0258645 A1 | 11/2007 | Gokturk |
| 2008/0080745 A1 | 4/2008 | Vanhoucke |
| 2008/0082426 A1 | 4/2008 | Gokturk |
| 2008/0091572 A1 | 4/2008 | Kraft |
| 2008/0109841 A1 | 5/2008 | Heather |
| 2008/0144943 A1 | 6/2008 | Gokturk |
| 2008/0151869 A1 | 6/2008 | Sylvain |
| 2008/0152231 A1 | 6/2008 | Gokturk |
| 2008/0154625 A1 | 6/2008 | Serbanescu |
| 2008/0162269 A1 | 7/2008 | Gilbert |
| 2008/0162574 A1 | 7/2008 | Gilbert |
| 2008/0177640 A1 | 7/2008 | Gokturk |
| 2008/0199075 A1 | 8/2008 | Gokturk |
| 2008/0212849 A1 | 9/2008 | Gao |
| 2008/0212899 A1 | 9/2008 | Gokturk |
| 2009/0019008 A1 | 1/2009 | Moore |
| 2009/0034782 A1 | 2/2009 | Gering |
| 2009/0177628 A1 | 7/2009 | Yanagisawa |
| 2009/0196510 A1 | 8/2009 | Gokturk |
| 2009/0208116 A1 | 8/2009 | Gokturk |
| 2009/0248599 A1 | 10/2009 | Hueter |
| 2010/0082604 A1 | 4/2010 | Gutt |
| 2010/0135582 A1 | 6/2010 | Gokturk |
| 2010/0135597 A1 | 6/2010 | Gokturk |

FOREIGN PATENT DOCUMENTS

| | | |
|---|---|---|
| JP | 2003216866 A | 7/2003 |
| JP | 2004220074 A | 8/2004 |
| JP | 2006113836 A | 4/2006 |
| JP | 2006119836 A | 5/2006 |
| KR | 2007077908 A | 7/2007 |

OTHER PUBLICATIONS

Non-Final Office Action dated Oct. 7, 2010 for U.S. Appl. No. 11/841,355, 15 pages.

Weinberger et al., "Nonlinear Dimensionality Reduction by Semidefinite Programming and Kernel Matrix Factorization", Proceedings of the 10th International Workshop on Artificial Intelligence and Statistics, 2005, pp. 381-388.

Roweis et al., "Nonlinear Dimensionality Reduction by Locally Linear Embedding", Science, vol. 290, Dec. 22, 2000, pp. 2323-2326.

(56) References Cited

OTHER PUBLICATIONS

Weinberger et al., Distance Metric Learning for Large Margin Nearest Neighbor Classification, Advances in Neural Information Processing Systems, vol. 18, 2006, pp. 1473-1480.
International Search Report, Written Opinion and Notice of Transmittal of same mailed Aug. 17, 2010 in PCT/US10/037139, 10 pages.
Notice of Allowance dated Oct. 29, 2010 for U.S. Appl. No. 12/431,706; 9 pages.
Arnold W.M. Smeulders, et al., "Content-Based Image Retrieval at the End of the Early Years", IEEE Transactions on Pattern Analysis and Machine Intelligence, vol. 22, No. 12. Dec. 2000, 32 pages.
Charles Frankel, et al., "WebSeer: An Image Search Engine for the World Wide Web", The University of Chicago, Computer Science Department, 110 East 58th Street, Chicago, Illinois 60637, Technical Report 96-14, Aug. 1, 1996, 24 pages.
Philippe Aigrain, et al., "Content-Based Representation and Retrieval of Visual Media: A State-of-the-Art Review", Multimedia Tools and Applications 3, 179-202, 1996, 24 pages.
Non-Final Office Action dated Feb. 7, 2011 for U.S. Appl. No. 12/395,422, 10 pages.
Non-Final Office Action dated Feb. 7, 2011 for U.S. Appl. No. 11/685,106, 12 pages.
Notice of Allowance dated Jan. 5, 2011 for U.S. Appl. No. 12/431,706; 9 pages.
Non-Final Office Action dated Mar. 25, 2011 for U.S. Appl. No. 11/777,894, 24 pages.
Non-Final Office Action dated Aug. 17, 2011 for U.S. Appl. No. 11/936,694, 8 pages.
Final Office Action dated Sep. 6, 2011 for U.S. Appl. No. 12/395,422, 11 pages.
Non-Final Office Action dated Oct. 12, 2011 for U.S. Appl. No. 12/819,901, 17 pages.
Non-Final Office Action dated Oct. 12, 2011 for U.S. Appl. No. 12/648,245, 17 pages.
Supplemental European Search Report dated Sep. 30, 2011 for EP Application No. 07868686.2, 8 pages.
Non-Final Office Action dated Oct. 21, 2011 for U.S. Appl. No. 12/962,494, 11 pages.
Notice of Allowance dated Nov. 10, 2011 for U.S. Appl. No. 12/819,970, 22 pages.
Non-Final Office Action dated Nov. 23, 2011 for U.S. Appl. No. 13/088,277, 10 pages.
Non-Final Office Action dated Nov. 22, 2011 for U.S. Appl. No. 12/961,790, 34 pages.
Final Office Action dated Dec. 6, 2011 for U.S. Appl. No. 11/777,894, 29 pages.
Non-Final Office Action dated Jan. 4, 2012 for U.S. Appl. No. 12/648,287, 17 pages.
Supplemental European Search Report dated Dec. 16, 2011 for EP Application No. 09798677.2, 8 pages.
Non-Final Office Action mailed Jan. 17, 2012, for U.S. Appl. No. 12/182,122, filed Jul. 29, 2008.
Final Office Action dated Feb. 23, 2012, issued in U.S. Appl. No. 12/503,034, filed Jul. 14, 2009.
Final Office Action dated Apr. 17, 2012, issued in U.S. Appl. No. 11/685,106, filed Mar. 12, 2007.
English translation of Chinese Office Action issued on May 2, 2012 in Chinese Application No. 200980132387.7.
Final Office Action dated Jun. 13, 2012, issued in U.S. Appl. No. 12/962,494, filed Dec. 7, 2010.
Yamaguchi et al., "'Smartface'—A Robust Face Recognition System under Varying Facial Pose and Expression*" IEICE Trans. Inf. & Syst., E86(1):37-44, Jan. 2003.
Notice of Allowance dated Jun. 19, 2012, issued in U.S. Appl. No. 12/819,901, filed Jun. 21, 2010.
Final Office Action dated Jun. 25, 2012, issued in U.S. Appl. No. 12/961,790, filed Dec. 7, 2010.
Final Office Action dated Aug. 7, 2012, issued in U.S. Appl. No. 12/182,122, filed Jul. 29, 2008.
Notice of Allowance dated Dec. 10, 2012, issued in U.S. Appl. No. 12/182,122, filed Jul. 29, 2008.
Final Office Action dated Aug. 12, 2013 issued in U.S. Appl. No. 13/618,653, filed Sep. 14, 2012.
International Preliminary Report on Patentability in Application PCT/US2006/038864, Nov. 27, 2008, 9 pages.
Non-Final Office Action dated Apr. 3, 2013 issued in U.S. Appl. No. 13/618,653, filed Sep. 14, 2012.
Non-Final Office Action dated Mar. 27, 2013, issued in U.S. Appl. No. 13/371,196, filed Feb. 10, 2012.
Non-Final Office Action dated Nov. 27, 2012, issued in U.S. Appl. No. 13/371,196, filed Feb. 10, 2012.
Notice of Allowance dated Feb. 13, 2009, issued in U.S. Appl. No. 11/246,742, filed Oct. 7, 2005.
Notice of Allowance dated Sep. 5, 2012 issued in U.S. Appl. No. 12/648,287, filed Dec. 28, 2009.
Notice of Allowance mailed Jul. 11, 2012, issued in U.S. Appl. No. 13/088,277, filed Apr. 15, 2011.
Notice of Allowance mailed Jul. 13, 2012, issued in U.S. Appl. No. 12/648,275, filed Dec. 28, 2009.
Office Action dated Sep. 12, 2012, issued in U.S. Appl. No. 12/503,034, filed Jul. 14, 2009.
Final Office Action dated Oct. 20, 2008 for U.S. Appl. No. 11/543,758, 7 Pages.
Final Office Action dated Aug. 11, 2008 for U.S. Appl. No. 11/246,741, 18 Pages.
Final Office Action dated Jun. 30, 2009 for U.S. Appl. No. 11/246,589, 13 Pages.
Final Office Action dated Jul. 7, 2009 for U.S. Appl. No. 11/777,070, 10 Pages.
Final Office Action dated Jun. 16, 2009 for U.S. Appl. No. 11/936,705, 20 Pages.
International Preliminary Report on Patentability and Written Opinion of the International Searching Authority in Application PCT/US2006/018016, Oct. 16, 2008, 12 pages.
International Preliminary Report on Patentability in Application PCT/US2006/038864, Dec. 11, 2008, 10 pages.
International Preliminary Report on Patentability and Written Opinion of the International Searching Authority in Application PCT/US2007/083935, May 22, 2009, 20 pages.
International Search Report and Written Opinion of the International Searching Authority in Application PCT/US06/18016, U.S. International Searching Authority, Jun. 17, 2008, 17 pages.
International Search Report and Written Opinion of the International Searching Authority in Application PCT/US06/38864, U.S. International Searching Authority, Oct. 14, 2008, 16 pages.
International Search Report and Written Opinion of the International Searching Authority in Application PCT/US07/83935, U.S. International Searching Authority, Aug. 18, 2008, 23 pages.
Non-Final Office Action dated Oct. 16, 2008 for U.S. Appl. No. 11/777,070, 10 Pages.
Non-Final Office Action dated Oct. 21, 2008 for U.S. Appl. No. 11/936,705, 18 Pages.
Non-Final Office Action dated Oct. 27, 2008 for U.S. Appl. No. 11/246,434, 11 Pages.
Non-Final Office Action dated May 28, 2009 for U.S. Appl. No. 11/246,434, 6 Pages.
Non-Final Office Action dated Oct. 27, 2008 for U.S. Appl. No. 11/936,734, 7 Pages.
Non-Final Office Action dated Dec. 29, 2008 for U.S. Appl. No. 11/246,589, 19 Pages.
Non-Final Office Action dated Dec. 30, 2008 for U.S. Appl. No. 11/936,713, 15 Pages.
Non-Final Office Action dated Apr. 7, 2009 for U.S. Appl. No. 11/246,741, 21 Pages.
Non-Final Office Action dated Dec. 6, 2007 for U.S. Appl. No. 11/246,741, 31 Pages.
Non-Final Office Action dated Jun. 3, 2008 for U.S. Appl. No. 11/246,742, 16 Pages.
Non-Final Office Action dated Jun. 6, 2008 for U.S. Appl. No. 11/543,758, 13 Pages.
Non-Final Office Action dated Aug. 6, 2009 for U.S. Appl. No. 11/936,734, 6 Pages.

(56) References Cited

OTHER PUBLICATIONS

Notice of Allowance dated Dec. 22, 2008 for U.S. Appl. No. 11/246,742, 12 Pages.
Notice of Allowance dated Apr. 17, 2009 for U.S. Appl. No. 11/543,758, 14 Pages.
Tu, Zhuowen et al., "Image Parsing: Unifying Segmentation, Detection, and Recognition," Proceedings of the Ninth IEEE International Conference on Computer Vision (ICCV 2003), University of California, Los Angeles, Los Angeles, CA 90095, 7 pages.
Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San Francisco, CA 94115, 9 pages.
Notice of Allowance dated Oct. 1, 2009 for U.S. Appl. No. 11/936,734, 12 Pages.
Notice of Allowance dated Sep. 28, 2009 for U.S. Appl. No. 11/936,713, 15 Pages.
Final Office Action dated Oct. 27, 2009 for U.S. Appl. No. 11/246,741, 20 Pages.
Non-Final Office Action dated Sep. 14, 2009 for U.S. Appl. No. 11/246,434, 11 pages.
Non-Final Office Action dated Sep. 30, 2009 for U.S. Appl. No. 12/431,706, 9 pages.
Notice of Allowance dated Sep. 17, 2009 for U.S. Appl. No. 11/936,705, 14 Pages.
Non-Final Office Action dated Dec. 2, 2009 for U.S. Appl. No. 11/246,589, 14 Pages.
Non-Final Office Action dated Dec. 15, 2009 for U.S. Appl. No. 12/395,422, 10 pages.
Notice of Allowance dated Feb. 22, 2010 for U.S. Appl. No. 11/246,343, 6 pages.
Liu, James et al., "Smart Shopper: An Agent-Based Web-Mining Approach to Internet Shopping," IEEE Transactions on Fuzzy Systems, vol. 11, No. 2, Apr. 2003, 12 pages.
Gangopadhyay, Aryya, "An image-based system for electronic retailing", Decision Support Systems 32, 2001, Department of Information Systems, University of Maryland Baltimore County, 1000 Hilltop Circle, ACIV 481, Baltimore, MD 21250, 10 pages.
Lii, Yi et al., "Object Recognition for Content-Based Image Retrieval", Department of Computer Science and Engineering, University of Washington, Seattle, WA 98195-2350, Jan. 2002, 21 pages.
Wang, James et al., "SIMPLIcity: Semantics-Sensitive Integrated Matching for Picture Libraries" IEEE Transactions on Pattern Analysis and Machine intelligence, vol. 23, No. 9, Sep. 2001, 17 pages.
Notice of Allowance dated Mar. 1, 2010 for U.S. Appl. No. 11/777,070, 11 pages.
International Search Report and Written Opinion mailed Feb. 24, 2010 in PCT/US2009/050600, 13 pages.
Order Granting/Denying Request for Inter Parts Reexamination mailed Apr. 26, 2010 for U.S. Appl. No. 95/001,30; 15 pages.
Action Closing Prosecution mailed Apr. 26, 2010 for U.S. Appl. No. 95/001,307; 20 pages.
Final Office Action mailed May 12, 2010 for U.S. Appl. No. 12/431,706; 12 pages.
Replacement Request for Ex Parte Reexamination dated Mar. 18, 2010 for U.S. Appl. No. 95/001,307, 145 pages.
Notice of Allowance dated Jun. 2, 2010 for U.S. Appl. No. 11/777,070, 16 pages.
Final Office Action dated Jun. 2, 2010 for U.S. Appl. No. 12/395,422, 21 pages.
Notice of Allowance dated Jun. 9, 2010 for U.S. Appl. No. 11/246,434, 11 pages.
Notice of Allowance dated Aug. 17, 2010 for U.S. Appl. No. 11/246,741, 23 pages.

SYSTEM AND METHOD FOR DISPLAYING CONTEXTUAL SUPPLEMENTAL CONTENT BASED ON IMAGE CONTENT

RELATED APPLICATIONS

This application is a continuation of U.S. patent application Ser. No. 13/858,589, filed on Apr. 8, 2013, which is a continuation of U.S. patent application Ser. No. 12/182,122, filed Jul. 29, 2008, issued as U.S. Pat. No. 8,416,981 on Apr. 9, 2013, which claims benefit of priority to provisional U.S. Patent Application No. 60/952,587, filed Jul. 29, 2007, and entitled "System and Method for Displaying Contextual Supplemental Content Based on Image Content." All of the aforementioned priority applications are hereby incorporated by reference in their entireties.

TECHNICAL FIELD

The disclosed embodiments relate to a system and method for targeting supplemental content from analysis of input images.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-Roms, and flash memory. The use of file folders is the primary source of organization, although applications have been created to aid users in organizing and viewing digital images. Some search engines, such as GOOGLE, also enables users to search for images, primarily by matching text-based search input to text metadata or content associated with images.

DETAILED DESCRIPTION

Figure 1:
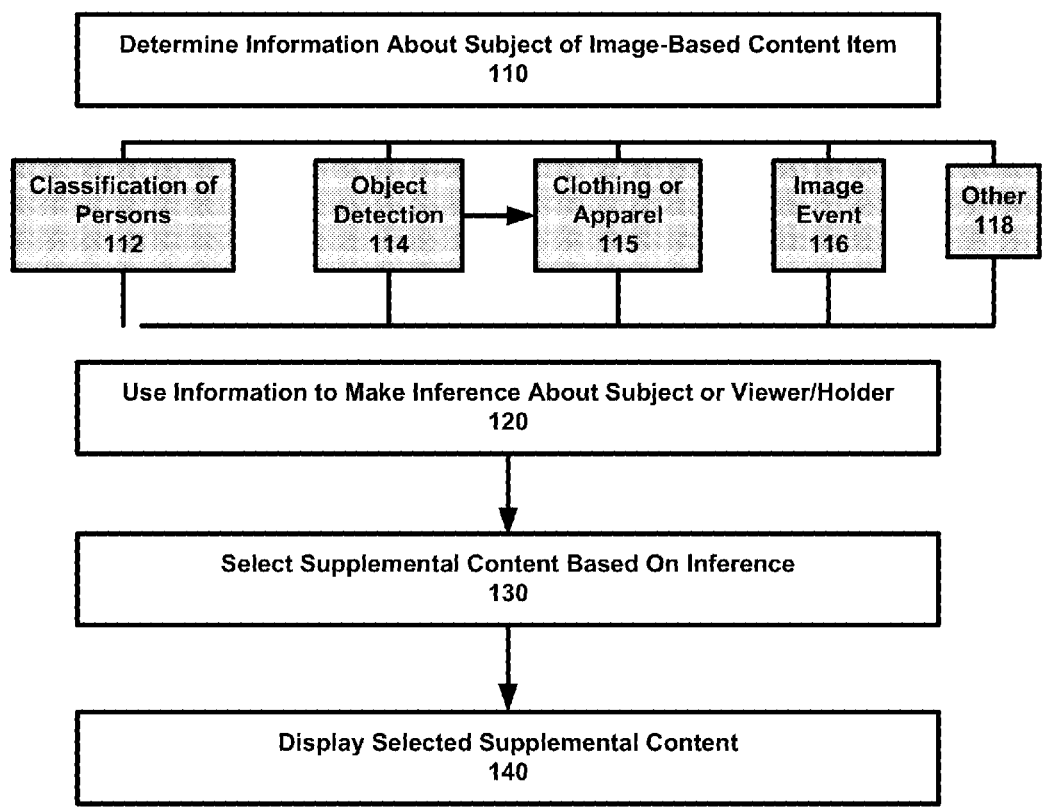
FIG. 1 illustrates a method for delivering supplemental content to a class of persons through use of image recognition or analysis of an image content of interest, under an embodiment of the invention.

According to an embodiment, computer-implemented processes are performed to provide content, such as commercial content, to a user. The processes provide for analyzing an image-based content item to determine information about a subject of the content item. The analysis of the content item may include performing image analysis on at least a portion of individual content items that includes an image. One or more inferences may be programmatically made about one or more of (i) a viewer or holder of the content item, or (ii) the subject of content item. According to an embodiment, programmatically made inferences may include inferences that are based at least in part on the determined information about the subject of the content item. The determined inferences may exclude (a) information made explicit in the content item, and (b) information that is depicted with one or more foreground objects in the image of individual content items in the set so as to be recognizable from performing recognition on the images of the individual content items.

According to an embodiment, the inferences are made to enable classification of the user (e.g. the viewer or holder of the image). Based on the classification of the user (or the inferences made of the content items), commercial content, such as in the form of supplemental content containing commercial links or advertisement, may be rendered or otherwise provided to the user.

Examples described herein provide for recognition of image-based content for the purpose of determining commercial or supplemental content (e.g. advertisement, message) for delivery to a pertinent class of viewers (or users). In one embodiment, recognition of image-based content is performed in order to select, or facilitate the selection of, supplemental content for delivery to a class of persons that view the image-based content. As an alternative or addition, one or more embodiments provide for performing recognition of image-based content in order to select, or facilitate the selection, of supplemental content for delivery to a viewer of an image library (e.g. person viewing his image library online).

As used herein, the term "subject" of a content item or set of content items (including of an image) is intended to mean a topic, person, place or event depicted, shown or otherwise described in the content item. Embodiments recognize that content items may have more than one subject or topic, and reference to "the subject" is intended to mean only one of multiple possible subjects.

As used herein, the term "image data" is intended to mean data that corresponds to or is based on one or more of (i) characteristics of a captured image, or (ii) discrete portions of a captured image. For example, with digital images, such as those provided in a JPEG format, the image data may correspond to data or information about pixels or pixel-clusters that form the image, as well as data or information determined from pixels of the image. Examples of image data include color values, identified shapes, or sections of a captured image.

The terms "recognize", or "recognition", or variants thereof, in the context of an image or image data (e.g. "recognize an image") means that a determination is made as to what the image contains, correlates to, represents, or identifies. Image recognition may be performed to detect and classify objects appearing in images.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used.

Such programmatic elements may include a program, a subroutine, a portion of a program, or a software component or a hardware component capable of performing one or more stated tasks or functions. As used herein, a module or component can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of the system provided for in this application may require use of memory, processors and network resources (including data ports, and signal lines (optical, electrical etc.), unless stated otherwise.

Embodiments described herein generally require the use of computers including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals and network enabled devices (e.g. mobile devices such as cell phones) are all examples of machines and devices that utilize processors, memory and instructions stored on computer-readable mediums.

Methodology

FIG. 1 illustrates a method for delivering supplemental content to a class of persons through use of image recognition or analysis of an image content of interest, according to an embodiment of the invention. Embodiments such as described with FIG. 1 may provide for the delivery of supplemental content to different classes of users. In one embodiment, the pertinent class of persons (to receive supplemental content) is the viewer. In another embodiment, the pertinent class of persons is the owner of the content. In either case, a method such as described with FIG. 1 may be performed to deliver, for example, select or targeted advertisement to persons based on inferences determined from analyzing image content.

In a step 110, analysis is performed on one or more image-based contents items that are viewed or collected/maintained by a user (i.e. a person who views, holds or owns the content). The analysis may be performed to determine information about a subject of the content item. In particular, the analysis performed may include image analysis (such as recognition) to identify or classify contents of the image portion of the content item. Image-based content items may also include text content (e.g. web blog with images), which can be analyzed using both text and image analysis. Other information that may be used in the analysis include metadata or user-information.

In one embodiment, a set of one or more content items are analyzed, where at least some of the content items include images. Various types of image-based content may be used with embodiments described herein. In one implementation, the image-based content is public, meaning that it is available to a large class of viewers. Specific examples include web content that incorporates or uses images (e.g. blogs, news stories). In another implementation, the image-based content corresponds to content that is private or restricted from the general public. Specific examples of such content include, for example, a private library of consumer photographs, such as maintained by individuals in online photo-storage sites or social networking sites. As such, the image-based content may correspond to content viewed by anyone who wants to access the content (e.g. public web page), or a privately held images (personal library or collection).

Different kinds of information may be determined about the subject of the content item. Step 110 may include any one or more sub-steps for determining information for use in identifying inferences about the person who will view supplemental content identified in part from the image content of interest. In particular, sub-steps 112 through 118 provide for image analysis processes that may be performed on the content item. In addition to performing image analysis (as described with steps 112 through 118), embodiments provide for performing the analysis of the content item using text analysis, metadata analysis, and/or user-information. Sub-step 112 provides for (i) detecting persons or faces in an image, then (ii) determining class-specific information about the persons detected in the image. In one embodiment, recognition processes may be performed to detect whether the image contains any one or more of the following: (i) a person of an age classification, (ii) a gender of a person appearing in the image, and/or (iii) an ethnicity of a person appearing in the images. In one embodiment, age classification includes multiple age classifications that are predefined. While such classifications may differ with implementation, one embodiment provides for the following use of age classifications: babies (humans under age 1) or toddlers (humans under age of 4), senior citizens (persons over 65), and persons of 5-64. These classifications are favorable because programmatically applied image recognition can more easily distinguish individuals in these four classes.

Gender detection corresponds to the determination of whether a person that appears in an image is male of female. Ethnicity detection may correspond to the determination of a person's ethnicity or race, as identified from detected skin color, hair color or type, eye shape, or other predefined features.

The following application includes teaching for identifying persons in captured images by class (e.g. gender or ethnicity): U.S. patent application Ser. No. 11/246,742, entitled SYSTEM AND METHOD FOR ENABLING THE USE OF CAPTURED IMAGES THROUGH RECOGNITION, filed on Oct. 7, 2005 and incorporated by reference in its entirety. Furthermore, as explained below, classification analysis of persons appearing in images can infer a corresponding classification of users (e.g. viewers) who are highly motivated by depicted classification of persons that are a subject of the content item. The inferred class of users can be targeted for advertisement or other supplemental content based on the understanding of their interest to, for example, the age or ethnicity classification of persons appearing in the content items.

Sub-steps 114 provides for detecting objects of different classifications from an image in the content item. Embodiments described herein are capable of recognizing or detecting numerous types of objects from captured images. In particular, one or more embodiments provide for objects to be identified from images based on predefined classes. As described, each object class may be predefined by a set of features (which may be initially set by humans, then trained algorithmically over time). These features may be selected for the specific class of objects as being the best markers to analyze the given object class. Thus, objects may be identified from images by first detecting class (e.g. human versus non-human), then determining sub-class (clothing), then determining sub-sub class (blouse). At each level of identification, the image analysis may seek markers that are indicative of the class or sub-class. The classification process may follow a tree structure of analysis, starting broad and becoming iteratively more narrow, with each sub-class analysis requiring identification of markers or features that are specific to the sub-class being sought. Markers and features may initially be provided by humans, but overtime, a training algorithm may be used to tune the detection and classification algorithm. As such, the objects in images can be classified, then sub-classified, and again classified further, with each iteration being more precise and feature specific. The end classification of objects appearing in the images of the content items may require identification of features or markers that could not be made programmatically without some prior general classification being made on the object. In this way, embodiments recognize features and markers that are useful in programmatic detection and classification of objects in images that are selected based on the specific classification being sought.

Examples of objects that can be detected from images include, for example, merchandise items (particularly those worn by persons, such as clothing, apparel, and jewelry), persons (as described in sub-step 112), automobiles/ motorcycles, or furniture. U.S. patent application Ser. No. 11/777,894, entitled SYSTEM AND METHOD FOR ENABLING IMAGE RECOGNITION AND SEARCHING OF REMOTE CONTENT ON DISPLAY, filed Jul. 13, 2007, and incorporated herein in its entirety, teaches detection of objects, particularly merchandise items worn by persons. U.S. patent application Ser. No. 11/246,742, entitled SYSTEM AND METHOD FOR ENABLING THE USE OF CAPTURED IMAGES THROUGH RECOGNITION, filed on Oct. 7, 2005 also includes description of object detection.

For example, an object in an image may first be identified as clothing or apparel, such as a shoe, tie, handbag, or item of clothing. Once classified, the item may be sub-classified through marker detection and analysis. For example, in the case of a shoe, markers indicative of whether the shoe is for men or women may be sought. In an image, this may correspond to detection of regions of the object, such as region that identifies whether the shoe has a heel or a pointed toe. But text accompanying the image may also be of assistance, to indicate the gender of the shoes. In this way, objects may be classified generically as shoes, then classified as a species of shoes (e.g. male or gender). Even further, the objects may be re-classified using a image and/or text analysis. For example, shoes may be classified by shape, texture, features such as shoe laces or buckles, and toe-end segments. Likewise, motorcycles may be recognized by presence of two wheels, handlebars, and seats.

The sub-step of object detection/classification may include identification of apparel, clothing or jewelry. Specific examples of apparel and clothing include shirts, pants, suits, dresses, shoes, ties, handbags, or scarfs. Performance of sub-step 115 may either (i) use recognition understanding/detection of persons (e.g. individual who wears clothes), or (ii) be independent of detecting or analyzing persons. Analysis of clothing, apparel and other items worn by persons is described in more detail in (i) U.S. patent application Ser. No. 11/777,894, entitled SYSTEM AND METHOD FOR ENABLING IMAGE RECOGNITION AND SEARCHING OF REMOTE CONTENT ON DISPLAY, filed Jul. 13, 2007, and (ii) U.S. patent application Ser. No. 11/246,742, entitled SYSTEM AND METHOD FOR ENABLING THE USE OF CAPTURED IMAGES THROUGH RECOGNITION, filed on Oct. 7, 2005 both of which teach detection of clothing and apparel.

As another addition or alternative, sub-step 116 provides for determining information about an event shown in the image of the content item. The information may identify, for example, a context of the event. The contextual information may include geographical information from the image content of interest. For example, analysis of the image input may determine whether the image contact is set at a beach, a city, a mountain area, a pool, or an urban environment. The geographic characterization of images can be performed by extracting color and pattern features and applying a classification scheme that includes some probability determinations. For example, a picture with textured green background is likely to have been taken in the outdoors, and a picture with gray tones and lots of vertical lines is likely to have been taken in an urban environment.

Numerous other parameters or characteristics may be predefined for identification and analysis of context or event information. The context may also include the number of persons in the image, the location or layout of persons relative to each other, and the time of day the image was taken (e.g. night or day). Such contextual/geographic setting information may assist programmatic determination of an event associated with the image (e.g. a party, vacation etc.). In one implementation, such programmatic determinations may be made through probability analysis.

As an optional process, one or more embodiments further provide in sub-step 118 for enhancing information determined from analysis of images through use of associated text, metadata and other information. This may include anyone or more of the following: (i) meta-information such as tags or web page content surrounding an image of interest; (ii) images from other images in an identified set of collection (part of the same folder, captured on the same day on the same camera etc.); (iii) information about the viewer of the image, for example IP address, or stored profile information about the user, or browsing history of the viewer; and/or (iv) information about the owner of the image.

As another optional step, one or more embodiments provide for certain confidence measures or parameters to be identified or otherwise performed. In one embodiment, a measure of similarity between elements of the images in the collection (for example face similarity, clothing similarity)

can be used to enhance the confidence in the detected characteristics. For example, if a picture contains a face determined to belong to a baby, but with low confidence, then the presence in the image set of another picture, (i) with a similar face, (ii) also determined to be a baby, suggests that this is indeed two pictures of the same baby with higher confidence. Thus, intelligence may be used to confirm a determination of step 110 using two or more sub-steps, or alternatively, information from two different sources.

From the information determined in step 110 (and any of the sub-steps), step 120 provides for determining inferences about (i) the subject of the content item, and/or (ii) the user of the content item. Inferences, as programmatically determined, may correspond to conclusions that are informative if true.

According to one embodiment, one type of inference that may be made in step 120 is the inference of a classification of the user based (in part) on a determination of the subject of the content item. For example, the user may be classified by gender, age, ethnicity, by his deemed interests in the subject matter, or (as described below) by his parental status. As will be described, in one embodiment, the inferences derived about the user include determination of social-economic status and/or marketing classification, for purpose of providing supplemental content that is targeted to the user.

In addition to inferences about the user, inferences may be made about the subject matter. Subject matter inferences may exclude (i) information that is made explicit in the content item, and (ii) information that is depicted with one or more foreground objects (e.g. detected or classified objects) that are recognizable from performing recognition or classification (step 110) on the images. Thus, identification of objects that are plainly depicted and classified from image analysis are not considered inferences. Identification of information that is explicit, in for example, the text of the content item is also not an inference. Rather, the inference may correspond to a conclusion that is drawn from information garnered from the analysis. Examples of such inferences include:

(i) Person Inferences. Person inferences may correspond to, for example, conclusions about relationships amongst persons that are identified in the content items. For example, person inferences may identify persons in content items as being friends, spouses, family members, or part of a common organization. Person inferences may also identify persons to be the same, using information other than identity recognition. For example, two babies may be assumed to be the same because the person holding them (i.e. the parent) is the same person. The confidence in the baby recognition may be low, but the confidence in the recognition of the parent is high, and the inference may be drawn.

(ii) Location Inferences: The background of the image portions of the content items may be analyzed to determine a location or geographic context to the image. For example, the background coloring and shading may be analyzed to determine whether the picture was taken indoors or outdoors, or in an urban environment (e.g. buildings), beach (bright sand, blue ocean) or in a forest (greens).

(iii) Event Inferences: Event inferences are an example of a context of the image or the content item. The event may be inferred from, for example, analysis of the images and the background. As an example, a celebration may be inferred based on individuals in groups smiling or laughing and being close to one another.

One or more embodiments provide for inferences that are probabilistic in nature. In particular, one or more embodiments provide that information is based on a probabilistic determination about the subject matter and context (who, where, when) of the image content of interest, or alternatively, a collection of images of the image content of interest. As described with an embodiment of FIG. 3, one or more embodiments may draw inferences by applying a set of rules and probabilistic conclusions to information determined about the viewer and/or the subject matter of the content items.

The following are examples of assumptions or determinations that may be made in performing step 120: (i) a male and a female are detected with faces in close proximity on a beach is likely to be a couple on summer vacation, (ii) a collection of pictures containing a single baby face on each image would likely be a baby photo album, (iii) a picture with a large number of same gender faces taken in the evening over a dark background is likely to be a group of friends at a party; and (iv) a group of pictures taken outdoors, with a couple of recurring faces which are not the center of focus of the image are likely to be a vacation slide show where people are posing in front of vacation sights.

In step 130, supplemental content is selected for the relevant party based on the determined inferences. The selected supplemental content may also be based on the relevant party who is assumed to be the viewer of the supplemental content when presented. Specific implementation examples include displaying advertisements on (i) web pages that host the user's collection of personal images, such as provided by user-web pages on social networks; (ii) web pages that the user views through interaction with a website; or (iii) images that the user views from a private collection (pictures the user takes on his own camera) on his personal computer.

As mentioned, step 120 provides for deriving inferences that correspond to socio-economic and/or marketing classification of the user. Such inferences may be correlated in step 130 to market segmentation information. The market segmentation may be based on either class of pertinent user: the owner of the images or the viewer of the images. The following examples are illustrative: (i) In step 110, the subject matter of a content item may be identified as including a baby; (ii) based in-part on the determined information from the analysis, step 120 may infer the user is a parent, and (iii) step 130 identifies market classification on the inference that the user is a parent of a baby. As an alternative, step 120 may infer that the viewer of the image of the baby is a person who has a relationship with the parent of the baby, and as such, is a person who is interested in purchasing a gift for the parent or baby.

Accordingly, in step 130, the market segmentation correlation to the inference may be used to select supplemental content for the user. In one embodiment, the determined information about the image content of interest, in connection with the relevant class of persons, is used to deliver targeted advertising to either class of users. The targeted advertisement, along with promotional material or just content deemed of interest, may comprise the supplemental content.

In step 140, the supplemental content is displayed or otherwise provided to the user. In one implementation, the supplemental content may be delivered concurrently with the viewer viewing the content items (e.g. display of banner ads when the user is viewing web content), or delivered asynchronously (e.g. delivered through email independent of when the user stores or views personal photo-album). In the case of advertisement or promotional content, for example, the supplemental content may take the form of web-based banner ads, side media or dynamic media presented as an overlay or in connection with other content (such as the image content of interest).

The following provide additional examples of relevant advertising that may result, with embodiments described herein: (i) viewers of beach pictures might be attracted to offers from beach resorts; (ii) viewers and owners of pictures taken outdoors might be more interested in an outdoor apparel campaign than viewers of urban setting pictures; (iii) viewers of a set of party pictures can be inferred to have the same biographical characteristics (gender, age class) displayed in those pictures or be the people in the pictures themselves (such viewers may be relevant to advertisers interested in associating with a "partying" lifestyle); (iv) Viewers/owners of dog pictures might be good targets for pet supply stores; (v) viewers/owners of pictures with several high-end luxury brands or logos are most likely affluent; (vi) Viewers of large collections of car or motorcycle pictures are most likely to be car or motorcycle enthusiasts; (vii) viewers/owners of pictures with multiple sports brands are most likely more active; and/or (viii) viewers of images containing brands, products and logos recognized in images can be good advertising targets for brand owners and makers of the products, or any of their competitors; and (ix) viewers of baby pictures, or content items containing babies, have interest in babies from the perspective or parent, guardian, or relative, and/or are inclined to be interested in products and services that are oriented for parents or those giving gifts to babies.

System

Figure 2:
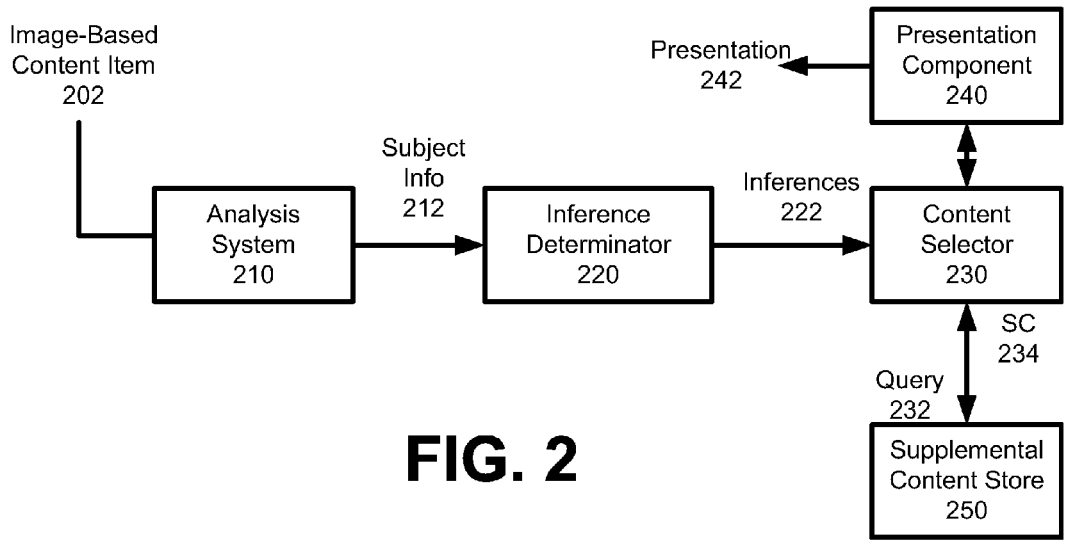
FIG. 2 illustrates a system for delivering supplemental content to a user through the use of image recognition or analysis of content items that are viewed, stored or otherwise of interest to a user, under an embodiment of the invention.

FIG. 2 illustrates a system for delivering supplemental content to user through use of image recognition or analysis of content items that are viewed, stored or otherwise of interest to a user, under an embodiment of the invention. In one embodiment, components of the system 200 include an analysis system 210, an inference determinator 220, a content selected 230, and a presentation component 240. Image-based content items 202 may be received as input, or otherwise identified by the analysis system 210. The content items 202 may correspond to an image from a collection or library (such as online photo-libraries), to a web page or portion thereof, to images returned as part of a search result or search query, or to other images that are displayed to a user when viewing other content in an online medium (e.g. blogs, social network pages).

Analysis system 210 may include components for analyzing image data contained in the image input 202. In an embodiment, analysis system 210 performs image analysis on image portions of the content item.

According to an embodiment, the analysis system 210 also scans text, identifies metadata, and/or associated sources of data outside of the image data of the input. Thus, for example, associated text and the URL link to a content item containing the image may all be used to determine information for determining inferences, as described elsewhere in this application. Numerous techniques for implementing analysis algorithms as part of analysis system 210 may be used, (including those for analyzing text or metadata), including those that are described in U.S. patent application Ser. No. 11/777,894, entitled SYSTEM AND METHOD FOR ENABLING IMAGE RECOGNITION AND SEARCHING OF REMOTE CONTENT ON DISPLAY, filed Jul. 13, 2007, which is incorporated by reference herein.

In one embodiment, an output of the analysis system 210 includes subject information 212. Subject information 212 may comprise results of image analysis performed on the image portion of the content item. Such information may be expressed or represented through vectors, text or image data, and be used to identify the classification of determined objects in the content item 202. For example, in one embodiment, the image analysis portion of system 210 may be configured to detect babies in the image of the content items, and the image data 212 may identify "baby" (e.g. as text) along with other information such as "with mother". As an alternative, the subject information 212 may simply output data that identifies the object of the image input 202 by class, and allow the inference determinator 220 to determine one or more inferences 222 therefrom.

As described with an embodiment of FIG. 1, inference determinator 220 determines one or more inferences 222 for use in providing supplemental content to a user. In one embodiment, separate inferences 222 are output depending on whether the user is a viewer or a holder/owner of the content items.

Content selector 230 may receive inferences from the inference determinator 220 and make selections of content items from a supplemental content item store 250. In one embodiment, the content selector 230 may determine a market segment from the inferences 222 outputted by the inference determinator 220. In addition to market segment, associated keywords may be used from which a query 232 is at least partially constructed.

Supplemental content items 234 may be identified by from the store 250 by associating a selection criteria with the determinations made in the analysis system. The determinations may account for the inferences that were made. In one embodiment, the selector 240 compares inferences, or information items associated with inferences, with information that is pre-associated or designated with supplemental content items 234 in the store 250. For example, in one implementation, a programmatically determined inference may be associated with a user's socio-economic class. The user class may form the basis of the selection criteria. As an option, the subject as identified from the content items may also be used as the basis for the selection criteria. In one implementation, supplemental content items may be tagged and retrieved to match the inferences by the selector 240. Supplemental content 234, or identifiers for supplemental content, may be returned to the content selector 230 (or fed directly to the presentation). The selected supplemental content 234 is then output for presentation.

A presentation component 240 may be used to render or delivery the supplemental content 234 to the target. The supplemental content 234 may be part of a presentation 242 that includes the content item 202. In the case of advertisement, for example, supplemental content 234 may be displayed as banner ads or side ads or dynamic media that hovers or is otherwise embedded in a page. The page may also contain the image of the content item 202. As an alternative, content item (e.g. one image file from a collection) may be displayed with a small advertisement media or a tag. Numerous other alternatives are also possible.

Figure 3:
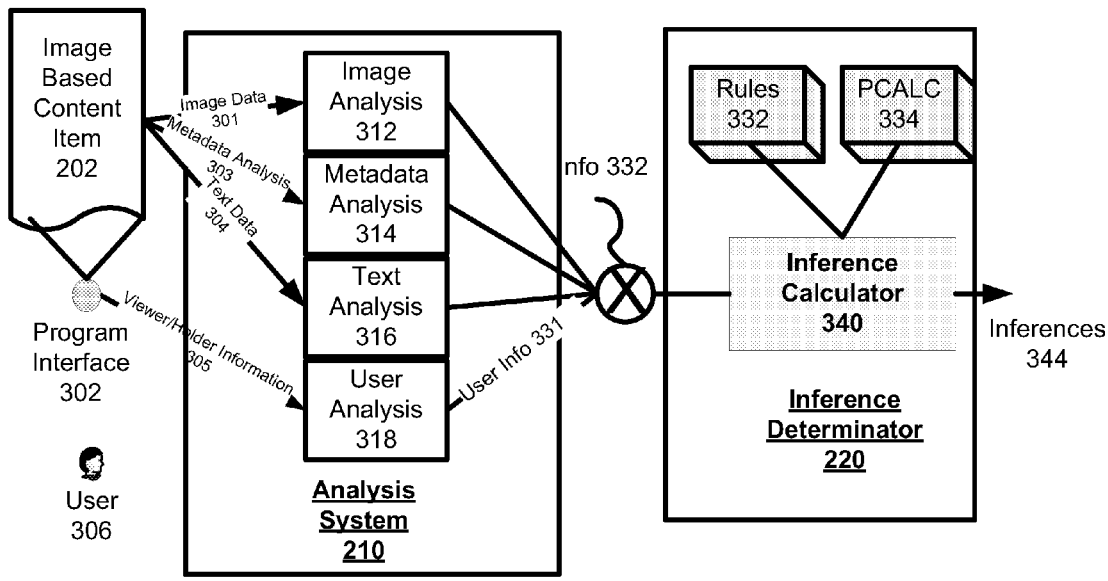
FIG. 3 illustrates additional components of an analysis system and inference determinator, under an embodiment of the invention.

FIG. 3 illustrates additional components of an analysis system and inference determinator, as shown with an embodiment of FIG. 2, according to one or more embodiments. The analysis system 210 may include components for image analysis 312, metadata analysis 314, text analysis 316, and user analysis 318. The components of the analysis system 210 may analyze content item 202 at the time that a user 306 views the content item, or independent from the time the user views the content item.

The image analysis component 312 may extract or use the image portion 301 of the content item to perform image analysis on the content item 202. In an embodiment, the image analysis component may perform processes that include (i) separating a foreground image from a background image, then (ii) detecting markers for certain types of objects (e.g. detect face by detecting eyes, nose, corner of mouth etc.).

Additionally, in one embodiment, the image analysis 210 includes one or more classifiers that use, for example, shape recognition to determine a class of objects contained in the content item. For example, as described above, the markers or classifiers may be organized in a tree structure that progresses by sub-class, with markers being progressively identified to sub-classes. This formulation enhances the classification process performed to detect objects in images that are not otherwise known to the analysis system 210. The result is that the classification can identify the presence of objects of a specific sub-class, such as a type of apparel (e.g. apparel for gender, apparel by price range or brand, material of apparel, apparel color). Likewise with persons, the classification can identify persons by ethnicity, gender or age through similar marker identification.

In one embodiment, the text analysis component 314 may extract text data 304, such as in the form of key or relevant words, from any text portion of the content item. The words for the analysis may be identified by identifying the frequency of words, and inspecting title, header or subject line information. Such words might be filtered by a proper noun dictionary if necessary.

Metadata analysis component 316 may extract and use various kinds of metadata 303. For images, the metadata analysis 316 may identify creation date and the creator (e.g. person or device that created or uploaded the image). The metadata analysis 316 may, for example, identify when multiple images are about a common event (approximately same creation time, same creator etc.). In the case of web based content items 202, the metadata may include link or URL analysis, which may include words or terms that are descriptive of the subject matter or context of the content item 202.

In an embodiment, the image analysis component 312, text analysis component 314, and metadata analysis 316 may extract or otherwise identify information from the content item 202 or information provided with the content item. In an embodiment, the user analysis component 318 may identify information from sources that include, for example, the software component 302 that the user utilizes to view the content items 202. The user's browser may, for example, be used to identify a general location of the user (e.g. through IP address). The user may also be required to logon to an account to view the content items 202. As an addition or alternative, information identifiable from the logon or the user's profile associated with an online or software-based account may be identified and used.

Information 332 determined from the analysis system 210 may be supplied to the inference determinator 220. As described with an embodiment of FIG. 2, this may correspond to subject information 212, which may be determined from image analysis component 312, text analysis component 316, and metadata analysis 314. As an addition or alternative, the information 332 provided to the inference determinator 220 may also include user information 331, as identified by the user analysis component 318.

The inference determinator 220 may include an inference calculator 340 that processes information 332 to programmatically make one more inferences 344 about (i) the subject of the content item, or (ii) the user (viewer or image holder) of the content item. According to an embodiment, the inference calculator 340 may use a combination of rules 332 and/or probabilistic calculations 334 to make the inferences 344. In one implementation, the rules 332 and/or probabilistic calculations 334 are designed by humans, through, for example, judgment, statistical sampling, and/or experimentation. The following provide examples of how rules 332 and/or probabilistic calculations 334 may be implemented:

Rule: For a private or semi-private collection of content items, if the subject matter of the content item is a baby, and if the user views the same baby (probabilistically) in multiple content items, the inference is that the user is either a parent (of the baby) or a close relative of the baby. In this case, one probabilistic calculation is based on the premise that the viewer wants to see his own child. As an alternative, if a person views baby pictures over a duration, he may simply be identified as a person who is likely to purchase a baby gift.

Rule: Likewise, if the subject matter of some content items includes multiple babies, but one baby is constant in all the content items, then the inference is that the user is most likely a parent. In this case, one probabilistic calculation is based on the premise that the viewer wants to see his own child.

Rule: Similarly, if the subject matter of the content item is a dog, and the user views the same dog (probabilistically) in multiple content items, the inference is that the user is a pet owner. In this case, one probabilistic calculation is based on the premise that pet owners keep images of their own pets.

Rule: If two people appear together in multiple images and in close proximity, then the premise is that the persons are friends or relatives.

Rule: If two people appear together in multiple images and in close proximity, and one person is older than 64 while another is a toddler or a baby, the inference is that the two persons are related, and that the older person is a grandparent. If the person has more images of older persons, then an inference may be made that the viewer is a grand-parent (based on the premise that older people keep or view images or content items depicting older people).

Rule: Event Based Inferences: If numerous persons are shown together in multiple images smiling, the inference is that those persons know each other and/or shared an experience at an event (e.g. a party or celebration).

Rule: Location Based Inference: When the user views images of a private or semi-private collection containing outdoor pictures with shapes and gray backgrounds, the inference is that the user lives in an urban setting. This confidence level of this inference may be based in part on the probabilistic calculation identified from, for example, the user's location (as determined from IP Address or other source).

Rule: Brand Inference: When the user repeatedly selects or views commercial images (advertisements) of a particular brand, a brand inference may be made that the user appreciates a particular brand. Furthermore, an inference may be made regarding the socio-economic class (e.g. salary range) or gender of the user based on the type of items viewed or the brand.

Numerous other rules or probabilistic calculations may be developed or implemented, for various environments. In particular, different rules and probabilistic assumptions may be developed for public, private or semi-private collections of images or other content items.

Figure 4:
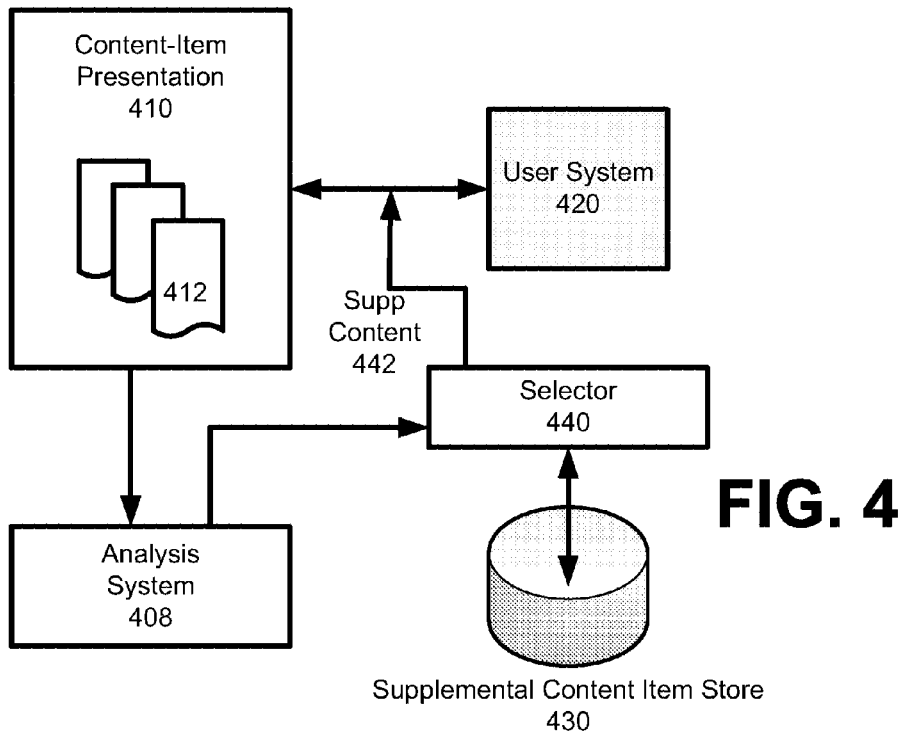
FIG. 4 illustrates an architecture for a computing system on which one or more embodiments described herein may be implemented.

FIG. 4 illustrates an architecture for a computing system on which one or more embodiments described herein may be implemented. In an embodiment, a computing system may comprise an analysis system 408, a content-item presentation element 410, a user system 420, a supplemental content item store 430, and a supplemental content item selector 440. The various components of the system may be provided on one location or proximity (e.g. on user's personal computer) or distributed in a network environment. In the latter case, the analysis system 408 and the presentation element 410 may be integrated or distributed. When distributed, they may be operated by different entities. For example, the presentation element 410 may be provided on a server that hosts a website, in which case the entity corresponds to the host of the website. In such cases, content items 412 (web articles, blogs etc.) may be provided (downloaded) from the host. In such cases, the analysis system 408 may interact with the presentation element 410 to determine the subject (or user) information and to make the inferences described with one or more other embodiments (e.g. see FIG. 2 and FIG. 3). In one implementation, at least some of the analysis, such as that of the content items 412, may be made prior to the user viewing the content items 412, while user information, on the other hand, may be optionally made at the time the user views the content item. Still further, under another implementation, the analysis system may use a history of the user's browsing experience to independently determine the subject matter information and/or inferences.

Alternatively, the presentation element 410 may correspond to a web page of a user on a social network site, in which case the entity of the presentation element may correspond to the user. In this case, the content items 412 of the presentation element 410 may be uploaded and maintained by the user, through, for example, the users account. The analysis of the content items and the user information may be made prior to, at time of, or after a user views the content items 412. The user may correspond to the individual who maintains the page (owner or private), or to an invited guest (semi-private).

Still further, in another variation, the analysis system 408 and the presentation element 410 may form part of the user system 410. For example, both components may reside on the user's personal computer.

The selector 440 may provide various kinds of targeted advertisement, promotional content, marketing material or other content or data. Such content may be selected from the supplemental content store 430. In one implementation such content may be combined as part of a presentation that includes the content items 408. For example, the analysis for making the inferences and for selecting the supplemental content items may be made right when the user views the content items 408. Alternatively, the selector 440 may select content items for presentation on a different platform and/or at a different time or place (e.g. in the user's browser from information determined by the user viewing personal images in a image viewer; via email after the user views a friend's social network page).

Thus, embodiments described herein contemplate numerous settings or environments where embodiments described herein may be implemented. Scenarios described with embodiments of FIG. 4 and elsewhere in the application only provide examples of the computing environment in which embodiments may be implemented.

Baby Like Implementation Scenario

The ability to identify social-economic classification of users and/or their interests from content that they viewed may serve as a powerful mechanism by which advertisement and commercial content may be delivered to a person. For example, embodiments recognize that parents of babies are highly marketable for advertisements of baby food, products, insurance and education. For this reason, embodiments recognize, for example, that there is significant monetary value associated with the ability to identify a web user browsing a site or service as a parent of a newborn "on-the-fly" or otherwise. If the person can be identified as such, then targeting banner ads, sponsored links or other form of commercial web content may be commercially successful. Similar conclusions may be drawn for pet owners, senior citizens, or other demographics that are known to be interested in particular kinds of products or services.

Figure 5:
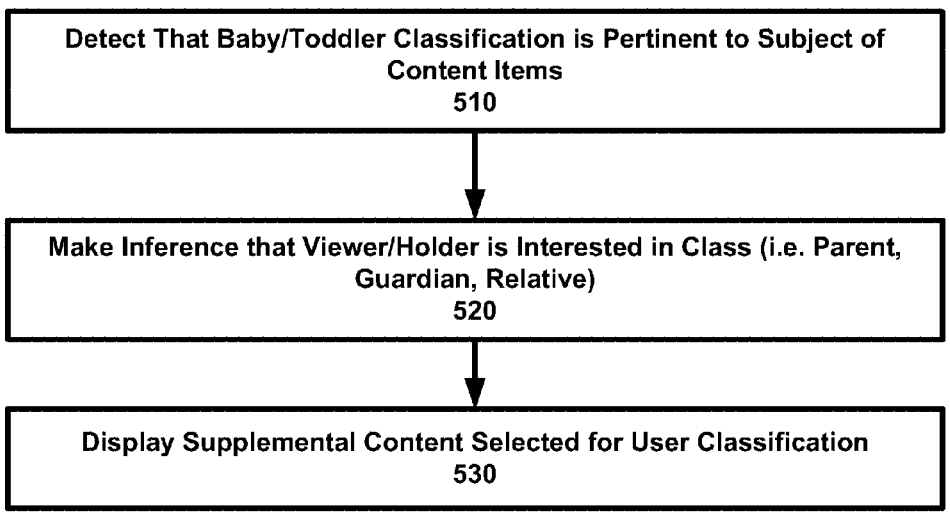
FIG. 5 illustrates a method by which a user's interests in babies or toddlers can be leveraged, in accordance with one or more embodiments of the invention.

FIG. 5 illustrates a method by which a user's interests in babies or toddlers can be leveraged, in accordance with one or more embodiments of the invention. In describing a method of FIG. 5, reference may be made to elements of other figures for the purpose of illustrating suitable components for performing a step or sub-step being described.

In a step 510, content items 202 (FIG. 2) are analyzed. In the analysis, one subject of the content items is determined to be babies or toddlers. The subject determination may be based in part on classifying objects that appear in images of the content item. For example, when the image is analyzed, person detection may be performed to identify the presence of a human from skin tone, eyes, lips, nose to eye features, hairline or other markers of a human. Once detected, face comparisons may be performed to model the face into one of the identifiable age groups (which may include babies or toddlers). Text accompanying the image (e.g. "He's 1 year old!!") or metadata (associated URL that has term "baby") may increase/decrease the confidence of the determination.

In step 520, an inference may be made from the information determined about the subject that the viewer or holder is interested in the class of babies. This inference may be made either with intelligence or without. For example, an assumption may be made that anyone who opens an image of a baby on a photo-sharing site is a parent or a person who is interested in babies or the particular baby shown. Alternatively, the inference may be made intelligently, using, for example, information determined from other pictures that the user has viewed, or the user's web or viewing history. When the inference is intelligently made, the inference is more likely to accurately reflect, for example, that the viewer is a parent or a person (e.g. guardian, close relative like Uncle, friend of a recent parent) who has interest in the class of babies or even baby products.

Step 530 provides that supplemental content is selected and displayed to the user based on the inference made about the user's interests in the class of babies. For example, in accordance with embodiments described herein, banner ads, dynamic web media, emails, or other forms of commercial content may be supplied to the user based on the user being identified as a class of persons who is interested in babies. For example, the user may be identified as a parent of a baby, and commercial content for baby food, clothes, or education funds may be provided to the user, either at the time of determination or at a later time (e.g. through email sent on a later date or as a web-banner in a subsequent browsing session etc.).

Supplemental Content Presentation

Figure 6:
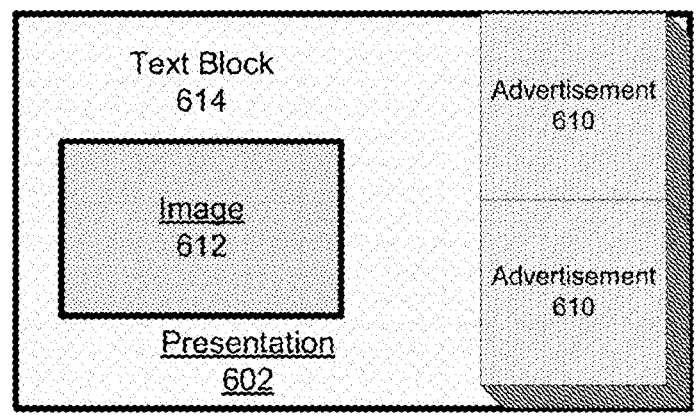
FIG. 6 illustrates a presentation on which supplemental content selected in part from inferences of other content and/or other inferences is displayed, under an embodiment.

FIG. 6 illustrates a presentation on which supplemental content selected in part from inferences of other content and/or other inferences is displayed, under an embodiment. The presentation 602 may include content items which are or have been analyzed for their subject matter. As described with other embodiments, inferences may be identified about the content items, including from image portions 612 and text portions 614. Still further, inferences may be determined about the viewer or user of the content items. For example, inferences may incorporate analysis of the image portions 612, text portions 614, and past content viewed from the user (e.g. based on user's prior history of viewing such content). As further described with other embodiments, the inferences that are determined may be used to identify one or more socio-economic classifications of the user.

In response to making the inferences, commercial content 610 may be programmatically selected for the viewer. In one embodiment, commercial content 610 may be selected based on the social-economic classification determined for the user. In the implementation shown, where presentation 602 is provided as part of a web page that is downloaded by the user through his browser, the commercial content 610 may be in the form of sponsored media, such as banners or sponsored links, web overlays or similar content. Each commercial content may include, for example, selectable links to enable the user to navigate directly to an e-commerce site or point of sale where an item identified as being of interest to the socio-economic class of the user (as identified from the inferences) is displayed.

Alternatives and Variations

As an addition or alternative to any embodiment described herein, information derived from images can be correlated directly with the effectiveness of advertisements displayed contextually through a learning process. An example of learning would involve: (i) displaying an ad campaign to users of a large collection of images; (ii) collecting click-through information from the campaign; (iii) using this data to build a prediction model which correlates click-through information with the image content; (iv) using this prediction model to drive a new, better targeted, advertising campaign.

The contextual advertisement could be delivered directly onto the image, as described in U.S. patent application Ser. No. 11/543,758, entitled SYSTEM AND METHOD FOR USE OF IMAGES WITH RECOGNITION ANALYSIS, filed Oct. 3, 2006 (and incorporated by reference herein). The advertisement may alternatively be delivered around the image, or in another location where the identity of the person can be established to be either the owner or a viewer of the image.

While embodiments described herein are specific to "images" and "image content", one or more embodiments described herein may also be applicable to video media. With video media, a frame capture component may be used to selectively identify frames of the video. For each frame, embodiments such as described in FIG. 1 or FIG. 2 may be implemented to determine inferences, and generate advertisement or other supplemental content to be displayed with the video segment. Numerous frame capture techniques exist. It will be appreciated that video offers an inherent ability to add confidence values to results of the image analysis. For example, video frames over a given time frame may be captured and compared to determine if results from frame to frame match.

CONCLUSION

As mentioned, it is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method performed by data processing apparatus, the method comprising:
   identifying, in a set of images, two or more people that are each depicted in one or more images in the set of images;
   determining, based on content depicted in the images in the set, a relationship between the two or more people;
   determining, based at least on the determined relationship, one or more interests of a user viewing the set of images;
   selecting, for the user, a content item based on the one or more interests; and
   providing, to a user device of the user, data that cause presentation of the content item at the user device.

2. The method of claim 1, further comprising determining an event at which at least one image of the set of images was captured, wherein the content item is selected further based on the determined event.

3. The method of claim 2, wherein determining the event comprises determining a type of location at which the at least one image was captured based on visual characteristics of the at least one image.

4. The method of claim 1, wherein:
   identifying the two or more people that are each depicted in the one or more images comprises identifying a baby in multiple images of the set of images;
   determining the relationship between the two or more people comprises determining that at least one of the two or more people is a parent of the baby; and
   determining the one or more interests of the user comprises determining that the user is interested in baby related content.

5. The method of claim 1, wherein:
   identifying the two or more people that are each depicted in the one or more images comprises identifying a group of people that have similar ages and that are depicted in the one or more images; and
   determining the relationship between the two or more people comprises determining that the group of people includes two or more friends based on the group of people having similar ages.

6. The method of claim 1, further comprising identifying an object that is depicted by two or more images in the set of images, wherein the content item is selected further based on the identified object.

7. The method of claim 1, wherein the set of images is a private set of images of the user or a person depicted in the set of images.

8. A system comprising:
   a data processing apparatus; and
   a computer storage medium encoded with a computer program, the program comprising data processing apparatus instructions that when executed by the data processing apparatus cause the data processing apparatus to perform operations comprising:
   identifying, in a set of images, two or more people that are each depicted in one or more images in the set of images;
   determining, based on content depicted in the images in the set, a relationship between the two or more people;
   determining, based at least on the determined relationship, one or more interests of a user viewing the set of images;

selecting, for the user, a content item based on the one or more interests; and providing, to a user device of the user, data that cause presentation of the content item at the user device.

9. The system of claim 8, wherein the operations further comprise determining an event at which at least one image of the set of images was captured, wherein the content item is selected further based on the determined event.

10. The system of claim 9, wherein determining the event comprises determining a type of location at which the at least one image was captured based on visual characteristics of the at least one image.

11. The system of claim 8, wherein:

identifying the two or more people that are each depicted in the one or more images comprises identifying a baby in multiple images of the set of images;

determining the relationship between the two or more people comprises determining that at least one of the two or more people is a parent of the baby; and determining the one or more interests of the user comprises determining that the user is interested in baby related content.

12. The system of claim 8, wherein:

identifying the two or more people that are each depicted in the one or more images comprises identifying a group of people that have similar ages and that are depicted in the one or more images; and determining the relationship between the two or more people comprises determining that the group of people includes two or more friends based on the group of people having similar ages.

13. The system of claim 8, wherein the operations further comprise identifying an object that is depicted by two or more images in the set of images, wherein the content item is selected further based on the identified object.

14. The system of claim 8, wherein the set of images is a private set of images of the user or a person depicted in the set of images.

15. A non-transitory computer storage medium encoded with a computer program, the program comprising instructions that when executed by one or more data processing apparatus cause the data processing apparatus to perform operations comprising:

identifying, in a set of images, two or more people that are each depicted in one or more images in the set of images;

determining, based on content depicted in the images in the set, a relationship between the two or more people;

determining, based at least on the determined relationship, one or more interests of a user viewing the set of images;

selecting, for the user, a content item based on the one or more interests; and providing, to a user device of the user, data that cause presentation of the content item at the user device.

16. The non-transitory computer storage medium of claim 15, wherein the operations further comprise determining an event at which at least one image of the set of images was captured, wherein the content item is selected further based on the determined event.

17. The non-transitory computer storage medium of claim 16, wherein determining the event comprises determining a type of location at which the at least one image was captured based on visual characteristics of the at least one image.

18. The non-transitory computer storage medium of claim 15, wherein:

identifying the two or more people that are each depicted in the one or more images comprises identifying a baby in multiple images of the set of images;

determining the relationship between the two or more people comprises determining that at least one of the two or more people is a parent of the baby; and determining the one or more interests of the user comprises determining that the user is interested in baby related content.

19. The non-transitory computer storage medium of claim 15, wherein:

identifying the two or more people that are each depicted in the one or more images comprises identifying a group of people that have similar ages and that are depicted in the one or more images; and determining the relationship between the two or more people comprises determining that the group of people includes two or more friends based on the group of people having similar ages.

20. The non-transitory computer storage medium of claim 15, wherein the operations further comprise identifying an object that is depicted by two or more images in the set of images, wherein the content item is selected further based on the identified object.

* * * * *